(12) United States Patent
Czazasty et al.

(10) Patent No.: US 10,981,318 B2
(45) Date of Patent: Apr. 20, 2021

(54) RHEOLOGICAL MEASUREMENT SYSTEM (71) Applicant: Dynisco Instruments LLC, Franklin, MA (US)

(72) Inventors: John A. Czazasty, Norton, MA (US); John R. Biagioni, Northbridge, MA (US); Kevin Craig, Medina, OH (US); Matthew Lockwood, Canton, MA (US); Michael P. Leonardi, Mansfield, MA (US)

(73) Assignee: Dynisco Instruments LLC, Franklin, MA (US)

( * ) Notice: Subject to any disclaimer, the term of this patent is extended or adjusted under 35 U.S.C. 154(b) by 242 days.

(21) Appl. No.: 15/783,165

(22) Filed: Oct. 13, 2017

(65) Prior Publication Data
US 2018/0104881 A1    Apr. 19, 2018

Related U.S. Application Data (60) Provisional application No. 62/408,657, filed on Oct. 14, 2016.

(51) Int. Cl.
*B29C 48/92* (2019.01)
*G01N 11/08* (2006.01)
(Continued)

(52) U.S. Cl.
CPC .............. *B29C 48/92* (2019.02); *B29C 37/00* (2013.01); *B29C 45/7646* (2013.01);
(Continued)

(58) Field of Classification Search
CPC ........ G01N 11/08; G01N 11/04; B29C 48/92; B29C 45/7646
See application file for complete search history.

(56) References Cited

U.S. PATENT DOCUMENTS 3,526,126 A * 9/1970 Kresge ................... G01N 11/04
                                                        73/64.54
3,590,641 A * 7/1971 Eggleston ................ G01L 7/04
                                                        73/742
(Continued)

FOREIGN PATENT DOCUMENTS

EP        2 706 335 A1    3/2014
EP        2706335 A1 *    3/2014     ........... G01L 9/0072

OTHER PUBLICATIONS

The American Society for Testing and Materials (ASTM) vol. 14.03, E 344-02 3.1 (2007). (Year: 2007).*
(Continued)

*Primary Examiner* — Jacob T Minskey
*Assistant Examiner* — Jennifer A Kessie
(74) *Attorney, Agent, or Firm* — Fish & Richardson P.C.

(57) ABSTRACT

Rheological measurement systems for use with systems including pressurized polymer melts and/or other viscous materials are described. In one embodiment, a rheometer is connected to an associated system with a bent, curved, or bendable tube to permit the rheometer to measure rheological properties in locations where the rheometer could not otherwise be located due to the presence of obstructions. Embodiments including rigid straight tubes for connecting a rheometer to an associated system are also described. In another embodiment, a flow-through rheometer is connected to an industry standard ½-20 thermowell aperture that is typically used for attaching temperature and pressure probes to a vessel containing a viscous material such as an extruder or injection molding system.

16 Claims, 3 Drawing Sheets

(51) Int. Cl.
*B29C 37/00* (2006.01)
*B29C 45/76* (2006.01)
*G01N 11/04* (2006.01)
*G01N 11/00* (2006.01)

(52) U.S. Cl.
CPC ............ *G01N 11/04* (2013.01); *G01N 11/08* (2013.01); *B29C 2037/903* (2013.01); *B29C 2945/7605* (2013.01); *B29C 2948/922* (2019.02); *G01N 2011/002* (2013.01)

(56) References Cited

U.S. PATENT DOCUMENTS

| | | |
|---|---|---|
| 4,241,602 A | 12/1980 | Han et al. |
| 5,347,851 A | 9/1994 | Grudzien, Jr. et al. |
| 5,708,197 A | 1/1998 | Todd et al. |

OTHER PUBLICATIONS

International Search Report and Written Opinion for International Application No. PCT/US2017/056501, dated Jan. 24, 2018.

\* cited by examiner

RHEOLOGICAL MEASUREMENT SYSTEM

CROSS-REFERENCE TO RELATED APPLICATIONS

This application claims the benefit under 35 U.S.C. § 119(e) of U.S. provisional application Ser. No. 62/408,657, filed Oct. 14, 2016, the disclosure of which is incorporated by reference in its entirety.

FIELD

Aspects of the disclosure relate to rheological measurement systems (also referred to as "rheometers") and in particular to real time and/or on-line rheometers.

BACKGROUND

In both manufacturing and laboratory settings it is desirable to accurately measure the rheological properties (i.e. viscosity or melt flow index) of plastically deformable materials such as, for example, synthetic resins, pastes, slurries, and food substances while they are processed. Plastically deformable materials such as these are melted or mixed and then extruded or injection molded to form solid objects such as injection molded parts, extruded shapes, fibers, extruded film, and shaped food stuffs. During rheological studies of these materials various parameters including, for example, the mixing, flow, viscosity, and properties of the plastic material being extruded through a vessel may be detected and analyzed. In manufacturing applications, the rheology of the material being extruded or injection molded may also be monitored for quality control of the process parameters.

A rheometer used to measure the above noted properties may be used to provide continuous measurements of the melt flow index, apparent viscosity, or intrinsic viscosity directly on the extruder. Typically, a rheometer may include three main parts: a Rheological Sensing Unit (RSU) that connects directly to the process and samples, conditions, and measures the properties of the resin and can be mounted on extruders, reactors, or molten polymer transfer lines in various orientations; a Rheological Control Unit (RCU) that controls the measurement parameters of the RSU (temperature, pressure, flow rate), and provides communications to a User Interface (UI); and the UI which may be used to manage test parameters as well as provide measured and computed material properties and rheological data similar to a Laboratory Capillary Rheometer, Melt Flow Indexer (MFI), plastometer, or other appropriate parameters.

SUMMARY

According to one embodiment, a rheological measurement system may include a flow through rheometer with an inlet and an outlet. The system may also include a tube with one or more bends or curves connected to the inlet of the rheometer. Additionally, a thermowell connection adapter may be attached to the tube, where the thermowell connection adapter is constructed and arranged to be attached to an aperture located along a flow path of a viscous material in an extruder or injection molding system. Further, a flow path may pass through an open end of the thermowell connection adapter to the inlet of the flow through rheometer.

According to another embodiment, a material processing system may include a vessel for containing a viscous material, and the vessel may include one or more apertures that extend from an exterior of the vessel to an interior of the vessel. Further, at least a portion of the one or more apertures may include a ½-20 thread. A flow through rheometer may also be connected to the one or more ½-20 threaded apertures.

It should be appreciated that the foregoing concepts, and additional concepts discussed below, may be arranged in any suitable combination, as the present disclosure is not limited in this respect. Additionally, the foregoing and other aspects, embodiments, and features of the present teachings can be more fully understood from the following description in conjunction with the accompanying drawings.

BRIEF DESCRIPTION OF THE DRAWINGS

Non-limiting embodiments that incorporate one or more aspects of the disclosure will be described by way of example with reference to the accompanying figures, which are schematic and are not necessarily intended to be drawn to scale. In the figures, each identical or nearly identical component illustrated is typically represented by a single numeral. For purposes of clarity, not every component is labeled in every figure, nor is every component of each embodiment of the disclosure shown where illustration is not necessary to allow those of ordinary skill in the art to understand the disclosure. Various embodiments of the disclosure will now be described, by way of example, with reference to the accompanying drawings, in which.

DETAILED DESCRIPTION

One of the biggest obstacles for polymer processors to adopt real time rheological measurements has been mechanical connection of the rheological equipment to the processing equipment. Some of the larger units utilize large inline flanged units or require flanged side port connections. Others utilize standard M18 threaded ports with conical metal sealing because these ports are large enough for direct mounting of the rheometers and permit the rheometers to include a both a flow inlet and flow return in the same port. Further, attaching the rheometers directly to these portions of the barrel, and returning the polymer melt after testing, helps to avoid material waste and avoids changes in the polymer melt properties due to the material being held at these elevated temperatures for increased time periods as they are transferred to a rheometer that is distanced from the barrel.

In addition to the above, many extruder or injection molding systems include one or more standard ½-20 threaded apertures (i.e. inch major diameter aperture with 20 threads per inch) that extend from an interior surface to an exterior surface of an extruder or injection molding barrel, nozzle, die, and/or other portion of the system along a flow path of the material flowing through the system. Further, these apertures are typically used with temperature and pressure probes. Further, these apertures are not used with rheometers due to the decreased size of ports relative to the more standard M18 threaded ports that are typically used with larger flow through rheometers. Specifically, the reduced area increases a pressure drop across the connection which may not be appropriate for use with a flow return type of rheometer due to the decreased size precluding the use of both a flow in and flow return tubes within the port. In addition to the above, the ½-20 apertures are oftentimes located at positions along an a material flow path where it is not possible to attach a rheometer directly to the system due to the presence of various obstructions along and/or around the these locations. Consequently, these apertures have not been used because it is difficult to impossible to directly connect a rheometer at these locations. Further, attempting to connect a rheometer to these apertures would have necessitated transferring the material with tubing which would require the transfer of the polymer melt across an increased distance, which as noted above, may lead to changes in the measured material properties.

In view of the above, the inventors have recognized the benefits associated with a rheometer that is connected to a vessel including a flow of viscous material therein, such as an extruder or injection molding system, with a shaped, curved, bent, or bendable tube to permit the rheometer to measure polymer melt properties in locations where the rheometer could not otherwise be located due to the presence of obstructions that prevent direct installation of the system while also taking into account the time temperature profile of the polymer melt to avoid excessive changes in the material properties. Additionally, the inventors have recognized the benefits associated with a flow-through rheometer that is connectable to an industry standard ½-20 thermowell aperture located along a flow path of material passing through an extruder or injection molding system. Of course, embodiments in which both of these concepts are combined are also contemplated.

Turning now to the figures, several specific embodiments are described in more detail. However, it should be understood that the various features and aspects described herein and shown in the figures may be used either singly or in any appropriate combination as the disclosure is not so limited. While the current embodiments described above, and in reference to the figures below, are directed to polymer processing systems such as extrusion and/or injection molding systems, the disclosed systems for measuring rheological properties may be used with any appropriate system including a flow of viscous material. Thus, the described systems may be combined with apertures formed in any appropriate vessel containing a flow of viscous material. Further, the described systems may be used to characterize materials other than polymer melts including, but not limited to glues, oils, food (e.g. chocolate), and other appropriate viscous materials as the disclosure is not so limited.

Figure 1:
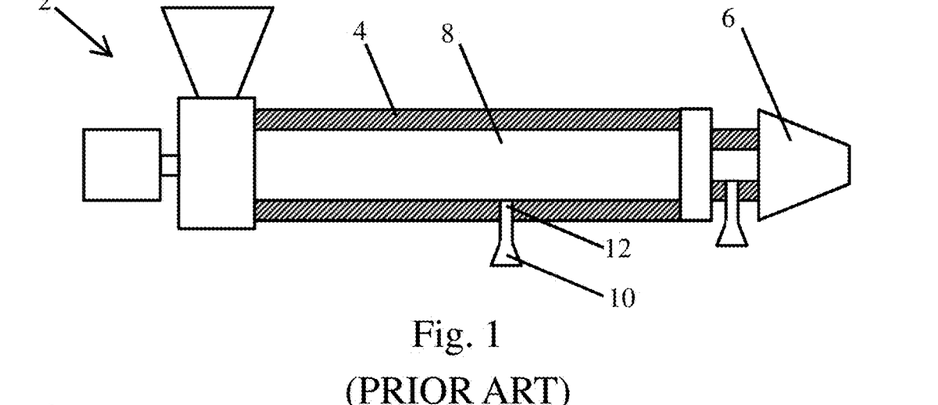
FIG. 1 is a schematic representation of prior art pressure transducers installed on one or more apertures located along the length of an extruder barrel.

FIG. 1, depicts a prior art extruder or injection molding system 2. The depicted system includes an extruder barrel 4 with a volume of polymer melt 8 contained therein. One or more conventional melt pressure transducers 10 are typically installed in one or more apertures 12 located along a length of flow path of the material through the extruding including, for example, the extruder barrel. A pressure of the molten material is measured as it flows past the transducer and toward an extrusion die 6. Typically, a conventional melt pressure transducer has threads along the outside of the transducer housing that mate with corresponding threads in the extruder barrel aperture to mechanically fix the transducer in the aperture with the transducer tip disposed in the aperture and exposed to the melt stream within the barrel bore. A high pressure seal is formed on a conical seat located between the high pressure chamber and the threads, not depicted. The connections used with these pressure transducers are typically referred to in the industry as a ½-20 thermowell type connection. Further, multiple ½-20 thermowell type connections are generally already included at various locational along the barrel of a system. Accordingly, providing a system that measures rheological properties through a ½-20 thermowell connection may eliminate the need for modifying existing systems to include larger apertures for connecting a system for the purpose of measuring rheological properties within the barrel.

Figure 2:
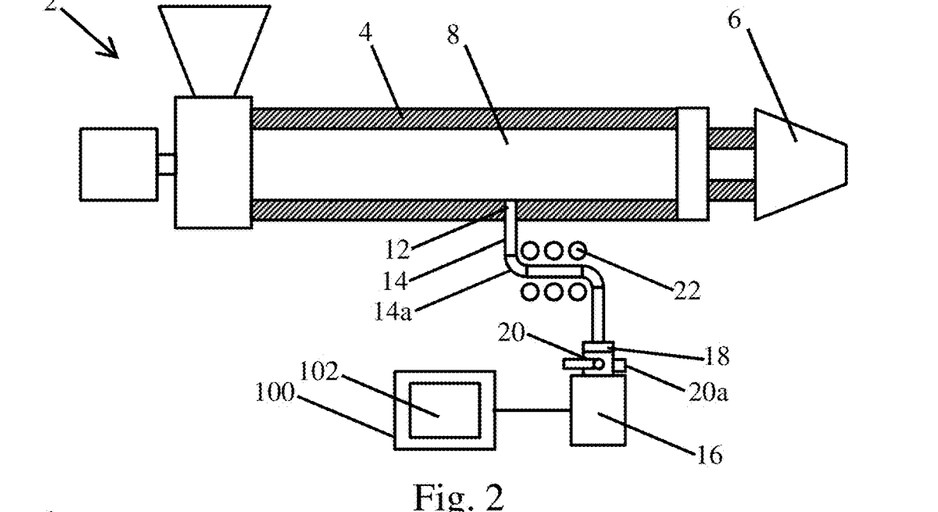
FIG. 2 is a schematic representation of a rheometer attached to an extruder barrel via a bent tube.

FIG. 2 illustrates an embodiment of a rheological monitoring system associated with a pressurized polymer melt contained within a vessel. In the depicted embodiment, the polymer melt containing vessel corresponds to a barrel 4 of an extruder or injection molding system 2 similar to that described above, though it should be understood that as described above these apertures may be located at any point along a flow path of the material flowing through the extruder or injection molding system. A tube 14 is in fluid communication with the pressurized polymer melt located within the barrel through a connection to aperture 12 formed in a wall of the barrel, or other vessel. The tube is also in fluid communication with an associated rheometer 16 through an adaptor 18 and valve 20. In some embodiments, the valve 20 may also include a purge port 20a so that the valve may be operated to divert a flow such that it is output through the purge port to keep material flowing through the transfer line to avoid the material stagnating and/or degrading within the transfer line. Consequently, the pressurized polymer may flow from the barrel interior, through the tube, and into the associated rheometer. In some embodiments, the rheometer may be a flow-through rheometer. Accordingly, the polymer melt may be expelled from the flow-through rheometer to atmosphere, for example into a waste container, without being fed back into the barrel or other pressurized vessel. Without wishing to be bound by theory, this may be beneficial because discharging the polymer melt to atmosphere more accurately emulates a capillary rheometer measurement as compared to a more typical flow return type rheometer.

Figure 3:
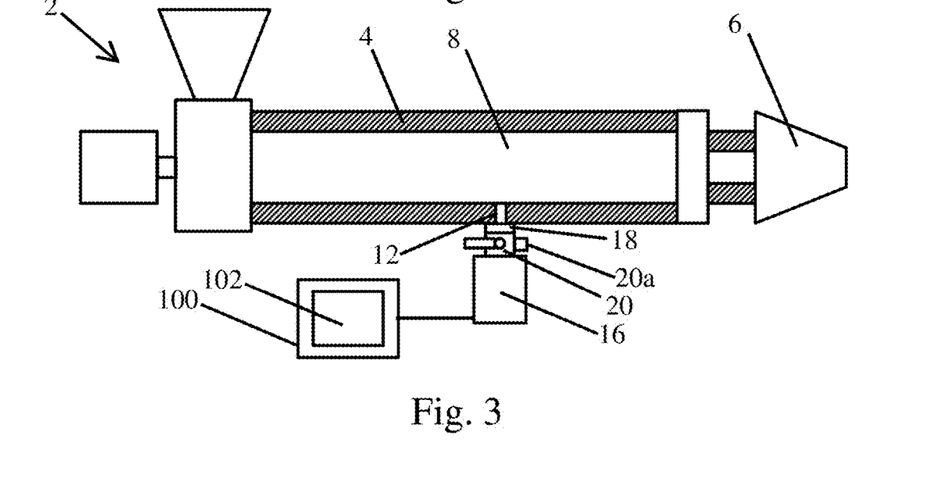
FIG. 3 is a schematic representation of a rheometer attached to an extruder barrel.

While a rheometer has been depicted as being attached to the barrel of an extruder or injection molding system using a tube above, it should be understood that a rheometer may be attached to the system at any point along a flow path of a viscous material through the a vessel containing the viscous material in the system including, but not limited to, a barrel, nozzle, die, or other appropriate portion of the system. Additionally, in some embodiments, a rheometer may be attached directly to an aperture formed in the wall of a vessel without the use of a tube as depicted in FIG. 3.

Turning again to FIG. 2, the depicted tube 14 may be secured to a wall of the barrel 4 using a pressure resistant securing mechanism (i.e. threads, weld, and other appropriate connection feature) for fixing the tube within the wall. As described further below, the tube may also include a sealing surface that cooperatively seals the connection with a mating surface formed on the associated wall. For example, in one embodiment, the sealing surface may correspond to a ½-20 thermowell connection formed by the mating portions of the tube and aperture. Depending on the particular embodiment, the tube may be positioned within the aperture 12 such that an open end of the tube is exposed to the pressurized melt in a non-flow obstructive relationship (i.e. the tube does not extend into an interior of the barrel). However, embodiments in which the tube extends into the barrel's, or other vessel's, interior are also contemplated as the disclosure is not so limited.

As also depicted in FIG. 2, in some embodiments, a tube 14 connecting a pressurized polymer melt 8 within a vessel, such as barrel 4, to an associated rheometer 16, may include one or more bends 14a along a length of the barrel. This may permit the use of a rheometer at a location along the barrel that is obstructed from directly attaching a rheometer to the barrel. Depending on the particular embodiment, the tube may simply be flexible and/or malleable enough to make the desired bends in the tube during installation. Depending on the particular application, the tube may be sufficiently rigid to maintain the bent shape after being released. For example, in one embodiment, a tube may be bent to a desired shape during installation and may maintain that shape after installation as well. Alternatively, the tube may be sufficiently rigid such that it cannot be bent to a shape during installation. Instead, the tube may be provided in a preformed shape as the disclosure is not so limited. Appropriate materials for the tube include, but are not limited to, stainless steel, steel, high strength Ni—Cr alloys, and/or any other appropriate material.

In some embodiments, it may be desirable to maintain a temperature of the polymer melt as it travels down a length of the tube. Consequently, one or more heaters 22 may extend along a length of a tube 14 such that the heaters heat at least a portion, and in some instances an entire length, of the tube. The heaters may correspond to any appropriate type of heater including, but not limited to, radiative heaters, induction heaters, conductive heaters, conduction heaters, and/or direct resistive heating of the tube itself as the disclosure is not so limited. Depending on the particular application, the one or more heaters may maintain a temperature of the polymer melt in the tube at a temperature between about 200° C. and 500° C., 250° C. and 500° C., 300° C. and 500° C., or any other appropriate temperature including temperatures both larger than and less than those noted above. For example, in instances where the systems are used for monitoring materials other than a polymer melt such as glues, oils, and/or foods, the temperatures of the materials may be between room temperature (about 20° C.) and 200° C.

Due to the polymer melt properties varying with both time and temperature, a length of a tube used to transfer a flow of pressurized polymer melt to an associated rheometer may be limited in length to limit changes in the polymer melt properties. Additionally, in some embodiments, curved and/or bent tubes may also be used that avoid abrupt changes in direction (such as a sharp elbow) that may induce excessive shear into the flowing material to also avoid changing the material properties, though tubing systems with discrete components such as elbows are also contemplated. In one embodiment, a length of the flow path extending through the tube may be greater than or equal to 1 inch, 6 inches, 12 inches, 18 inches, 24 inches, 36 inches, 48 inches, or any other appropriate length. Additionally, the length of the flow path may be less than or equal to 100 inches, 48 inches, 36 inches, 30 inches, 24 inches, 18 inches, 12 inches, and/or any other appropriate length. Combinations of the above-noted lengths are contemplated including, for example, a tube with a flow path length between or equal to 1 inch and 100 inches, 6 inches and 36 inches. However, other combinations of the above noted lengths as well as flow path lengths that are both larger and smaller than those noted above are also contemplated as the disclosure is not so limited.

Due to the systems described herein being used to characterize high-temperature materials, such as high temperature polymer melts, in some embodiments, it may be desirable for a tube used to transfer the pressurized material to an associated rheometer to have an elevated continuous operating temperature that is compatible with the operating temperature and pressure of a pressurized material within a material processing system. Specifically, the tube may have a sufficiently high melting point and sufficient yield strength and/or tensile strength to be continuously operable to transfer a pressurized flow of material to the flow through rheometer at the temperature and pressure of the pressurized material without failing during operation. In one particular application, a material that the tube is made out of may be capable of operating continuously at temperatures greater than or equal to 200° C., 250° C., 300° C., or any other appropriate temperature. Correspondingly, the material may be capable of operating continuously at temperatures less than or equal to 500° C., 400° C., 300° C., or any other appropriate temperature. For example, a tube may be made out of materials that are capable of continuously operating at temperatures between 250° C. and 500° C. though other combinations of the above ranges are also contemplated. While specific temperature ranges for continuous operation have been described above, it should be understood that materials suitable for operation at temperatures both lower and higher than those noted above are also contemplated including temperatures down to, and/or below, room temperature (about 20° C.).

Depending on the particular application, a vessel, such as the described barrels, dies, and/or molds as well as the associated tubing, connections, and rheometer may be subjected to varying amounts pressure. Therefore, in order to avoid leakage, it may be desirable to construct the components to operate at these pressures without leaking using appropriate seals as described further below. Pressures for which these components may be constructed to withstand without leaking may be greater than or equal to 100 pounds per square inch (psi), 200 psi, 500 psi, 1000 psi, or any other appropriate pressure. The pressures these components are constructed to withstand without leaking may also be less than or equal to 40,000 psi, 20,000 psi, 10,000 psi, 5000 psi, 1000 psi, 500 psi, or any other appropriate pressure. Combinations of the above noted pressure ranges are contemplated including, for example, pressures between 100 psi and 10,000 psi as well as 1000 psi and 5000 psi. However, other combinations of the above noted pressure ranges as well as pressures both smaller and larger than those noted above are also possible as the disclosure is not so limited.

Having generally described a rheological sensing unit and its attachment to an associated pressurized polymer melt, or other material, for characterization, operation of the system is described further below in reference to FIG. 2. When it is desired to measure the rheological properties of a polymer melt 8, a valve 20 that is in fluid communication with, and controls the flow of polymer melt through, the tube 4 is selectively moved from a closed position to an open position to selectively permit the flow of polymer melt from the barrel 4 along a flow path through the tube. Alternatively, the valve may be positioned such that a purge port 20a is open and the polymer melt is output through the purge port to keep material flowing through the tube when the rheometer is not in use. In either case, as the polymer melt travels through the tube it is maintained at a desired temperature by one or more heaters 22 located along a length of the tube. During operating of the rheometer, the polymer melt flows through an adapter 18 and now open valve 20 and into an inlet of the flow through rheometer 16. Once the polymer melt is within the rheometer, the polymer melt is characterized and then expelled through an outlet from the rheometer to atmosphere without returning to the barrel. For example, the polymer melt passing through the flow through rheometer may be output into a waste container such as a bucket, not depicted. Once the measurement of the rheological properties of the polymer melt is complete, the valve may be moved from the open position to the closed position to terminate flow through the associated tube and rheometer. The valve may either be manually operated and/or an appropriate pneumatic, hydraulic, electromagnetic, or any other appropriate type of actuator may be used to selectively move the valve between the open and closed positions.

Referencing FIGS. 2 and 3, signals corresponding to the measured properties of a polymer melt, or other material, by a rheometer 16 are output to a controller 100. For example, flow rate, pressure, and/or temperature signals measured by the rheometer may be output to the controller. These signals may then be used to control the temperature and pressure of the rheometer using any appropriate control loop. The signals may also be used to determine one or more rheological properties such as melt flow index, apparent viscosity, and/or intrinsic viscosity that may then be presented on a display 102 in electrical communication with the controller. The display may depict data from the rheometer in any appropriate fashion including numerical, text, and/or graphical formats. Depending on the particular embodiment, the controller may also be in electrical communication with a user interface, not depicted, for inputting commands such as user input to manipulate the flow rate, pressures, and/or temperatures for use in the rheometer to capture the properties of a material being measured. Communication between the rheometer and controller may be provided in any appropriate fashion including, but not limited to, a wired connection, a wireless transmitter, communication with a remotely located computing device and/or server, as well as any other appropriate type of communication as the disclosure is not so limited. For example, a remotely located computing device may be used to view data from the rheometer and the determined rheological properties and in some embodiments, the computing device may also be used to interact with and remotely control operation of the rheometer.

While not depicted above, the controller 100 of a rheometer 16 may also be in electrical communication with a controller of an associated extruder or injection molding system. Accordingly, an open or closed feedback loop may be implemented where the measured rheological properties of the polymer melt 8 may be used to alter one or more operating parameters of the extruder or injection molding system. These operating parameters may include, but are not limited to, pressure, temperature of the polymer melt, extrusion and/or injection rate of the polymer melt, a polymer material blend such as the ratio of virgin and regrind material, and/or any other appropriate control parameter as the disclosure is not so limited.

Figure 4:
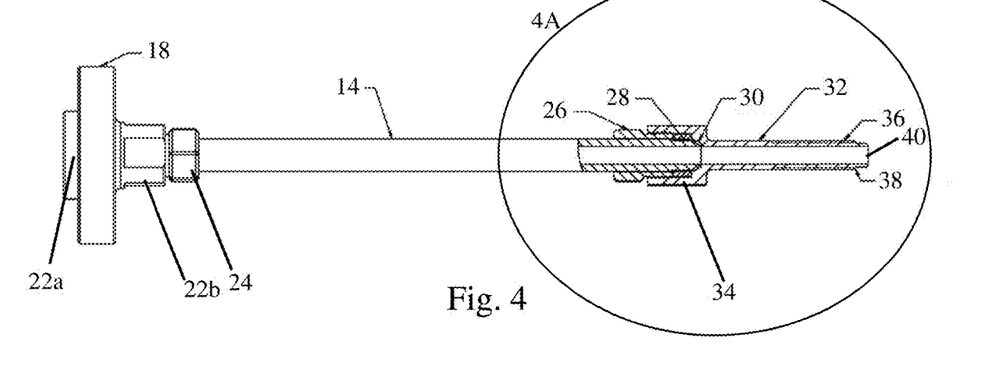
FIG. 4 is a is a schematic representation of a tube constructed to be attached to a rheometer at one end and an extruder barrel at the other end.
Figure 4A:
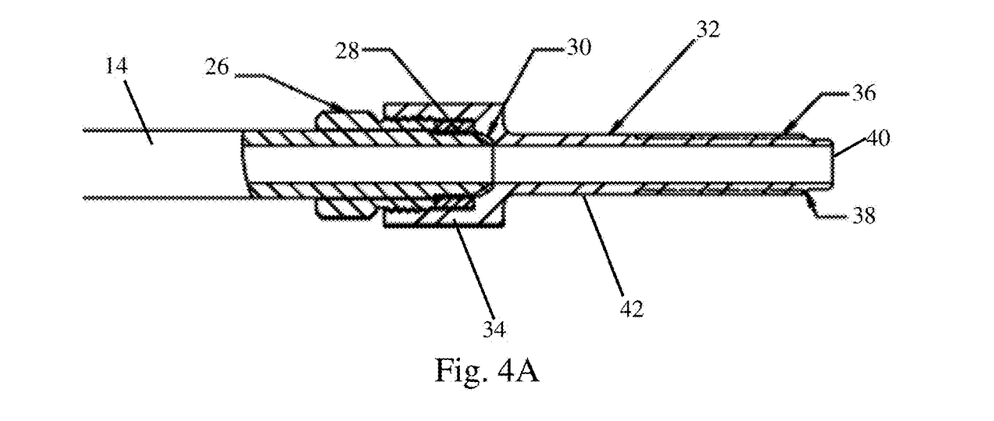
FIG. 4A is an enlarged view of the end of the tube depicted in FIG. 4 that is attachable to an extruder barrel.
Figure 5:
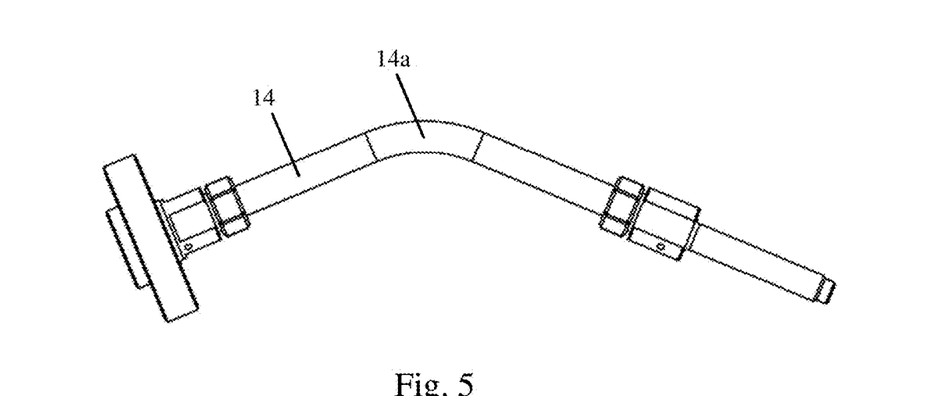
FIG. 5 is a schematic representation of the tube of FIG. 4 in a bent configuration.

The specifics associated with one embodiment of a tube and associated connections for connecting a rheometer to a vessel including a flow of pressurized viscous material, such as an extruder or injection molding system, are described further in regards to FIGS. 4-5. In the depicted embodiment, an adapter 18 includes a first interface 22a that connects to the inlet of an associated rheometer and a second interface 22b located on an opposing side of the adapter for connecting to an end of the tube 14. An opposing end of the tube 14 is attached to a ½-20 process adapter 32 that forms one portion of a thermowell connection adapter. Specifically, the process adapter includes a first end 34 that includes a threaded recess that is attached to the tube. A thermowell shank 42, which may either be straight, stepped, and/or tapered, extends out from the first end with an aperture extending through the shank to an open second end 40 that is exposed to the polymer melt within the barrel. In some embodiments, a length of the shank may be selected so that it does not extend into the polymer melt when installed in a wall of the associated barrel or other pressure vessel. In some embodiments, the shank includes a threaded portion 36 which, as noted above, may include a ½-20 thread. A conical sealing surface 38 may also be included on the shank such that the process adapter is capable of forming a pressure seal with a corresponding conical surface located in the thermowell connection formed in the barrel.

While any appropriate connection may be used in the systems described above, in some embodiments, it may be desirable for the one or more connections associated with the system to be connectable while the various components remain rotationally stationary relative to one another in a desired orientation and/or shape. This may include connections such as the connection 24 between the rheometer adapter and tube and/or the connection between the tube and process adapter 32 that is connected to the barrel. This may permit a tube including one or more bends 14a, as shown in FIG. 5, to be connected to an extrusion barrel and/or a rheometer while keeping the tube in a desired orientation and position to avoid one or more obstructions associated with a system to be monitored by the rheometer. In one such embodiment, connection 24 may correspond to a high-pressure seal including a female connector portion with a sealing surface formed in the adapter and a collar and gland located on the tube that form a compression seal when tightened. As also depicted in the figure, the connection between the tube 14 and process adapter 32 may correspond to a gland and collar connection including a threaded gland 26 that is rotatable relative the tube and is threaded into a threaded first end 34 of the process adapter. When the gland is rotated, a collar 28 located within the first end of the process adapter is compressed and a metal conical sealing surface located on a distal portion, or end, of the tube is compressed against a corresponding sealing surface of the process adapter to form a pressure seal there between.

While specific types of connections are described above and shown in the figures, it should be understood that any appropriate type of connection capable of forming a pressure seal for the desired pressure ranges, and connecting the tube and associated rheometer to a pressurized vessel in a desired orientation and position, may be used as the disclosure is not limited in this fashion.

Figure 6:
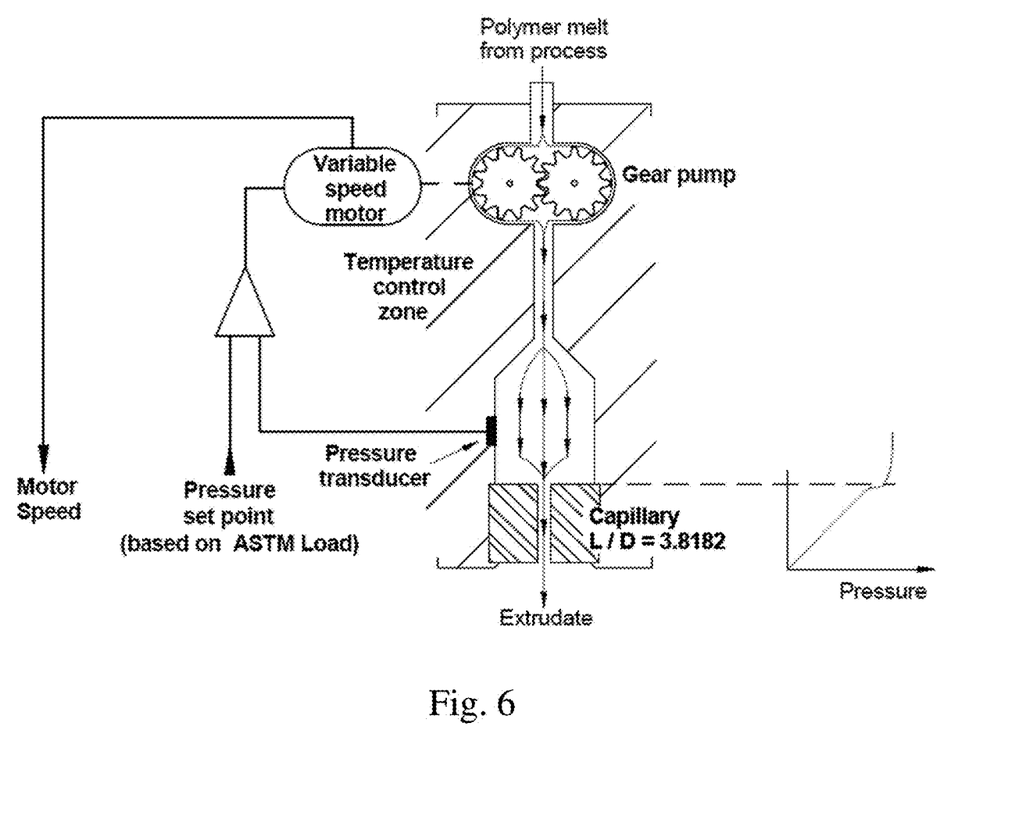
FIG. 6 is a schematic representation of a capillary rheometer.

One embodiment of a rheometer that may be used with the embodiments described above is shown in FIG. 6. In the depicted embodiment, the rheometer includes an inlet through which the polymer melt from a process being monitored enters. The polymer melt then passes through a pump, such as the depicted gear pump, to deliver a quantity of the polymer melt to an associated chamber at a desired pressure and/or flow rate. A pressure transducer is disposed within the chamber for measuring the pressure therein. As the polymer melt flows into the chamber, the polymer melt also passes through a temperature control region where the polymer melt is brought to a desired temperature for measurement purposes. An outlet from the chamber may have a desired length to diameter ratio for a particular capillary viscosity test. In order to appropriately control the applied pressure for a given viscosity test, a control loop may be implemented using a signal from the pressure transducer, a pressure set point based on appropriate load standards, and other appropriate parameters to control a motor speed of a variable speed motor that drives the gear pump to maintain one or more operating parameters for a desired material characterization test. Based on the forgoing, as the material flows through the outlet the sensed pressure and/or flow rate of material from the chamber through the outlet may be correlated with a viscosity of the polymer melt.

While a particular rheometer is described above in regards to the figures, it should be understood that any appropriate type of rheometer, including both flow through, flow return, and batch analysis type rheometers may be used with the various embodiments described herein as the disclosure is not limited to any particular type of rheometer.

The controls and controllers described herein may be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semicustom or custom. As a specific example, some commercially available microprocessors have multiple cores such that one or a subset of those cores may constitute a processor. Though, a processor may be implemented using circuitry in any suitable format.

Further, it should be appreciated that a computing device used as a controller for the systems described herein may be embodied in any of a number of forms, such as a rack-mounted computer, a desktop computer, a laptop computer, or a tablet computer. Additionally, a computing device used as a controller of the described systems may be embedded in a device not generally regarded as a computing device but with suitable processing capabilities, including a Personal Digital Assistant (PDA), a smart phone, a tablet, or any other suitable portable or fixed electronic device.

In instances where a computing device is remotely located from a system being monitored and/or controlled. The computing device may use any appropriate operating protocol. Including but not limited to Windows internet of things (IoT) remote client application or other appropriate operating system or program. For example, the Windows IoT Remote Client application is a part of a remote display and sensor technology program optionally available for devices running IoT Core, and a companion Windows 10 device running this application. This can be used to connect the two devices. Therefore, the Windows 10 IoT Core device may transmit a user interface to a display on the companion device, while receiving input and sensor data in return. This may allow for complete remote control of a rheological system from a Windows 10 desktop PC, tablet, phone, or other computing device. Of course, it should be understood that any application, program, operating system, or other method of remotely monitoring and/or operating a rheological sensing unit may be used as the disclosure is not so limited.

In view of the above, in some embodiments, a rheological sensing unit may be capable of displaying a user interface on a remotely located computer, phone, tablet, or other computing device to provide information to the user. Other ways in which information may be provided to an operator include text message, email, or other similar digital communications. Additionally, in some embodiments, the remotely located computing device may be used to control a rheological sensing unit using any appropriate input device including for example, a mouse click, touch, keyboard input or other appropriate user input. This may enable an operator to monitor and/or change operation of the rheometer remotely. Accordingly, a system may be monitored and/or controlled on a periodic basis without requiring the operator to be located onsite. In addition to periodic monitoring, information may be sent to the remotely located computing device when a monitored quantity such as pressure, temperature, and/or measured material properties (e.g. melt flow index, apparent viscosity, and/or intrinsic viscosity) are above an upper alarm threshold or below a lower alarm threshold as well as when a preconfigured status of the system has changed.

In addition to the above, a computing device may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computing device may receive input information through speech recognition or in other audible format.

In addition to the above, plastics machinery operate at elevated temperatures. So operators working on a machine often wear gloves that make interaction with touchscreens, keyboards, and other human machine interface elements difficult. Therefore, in some embodiments, a computing device associated with a system may include appropriate audio inputs and voice recognition software to enable the system to accept voice commands (similar to iPhones Siri) to change machine parameters and/or set points. This may enable an operator to work on hot equipment with gloves on while still interacting with the system. Similarly, audio devices, i.e. speakers, may be included with a system to provide audio feedback regarding the set parameters and/or measured quantities to enable operator feedback without the need to check a display.

The above noted computing devices may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the disclosed embodiments may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present invention as discussed above. As used herein, the term "computer-readable storage medium" encompasses only a non-transitory computer-readable medium that can be considered to be a manufacture (i.e., article of manufacture) or a machine. Alternatively or additionally, the invention may be embodied as a computer readable medium other than a computer-readable storage medium, such as a propagating signal.

The terms "program" or "software" are used herein in a generic sense to refer to any type of computer code or set of computer-executable instructions that can be employed to program a computing device or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

Various aspects of the apparatus and techniques described herein may be used alone, in combination, or in a variety of arrangements not specifically discussed in the embodiments described in the foregoing description and is therefore not limited in its application to the details and arrangement of components set forth in the foregoing description or illustrated in the drawings. For example, aspects described in one embodiment may be combined in any manner with aspects described in other embodiments.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including", "comprising", "having", "containing" or "involving" and variations thereof herein, is meant to encompass the items listed thereafter and equivalents thereof as well as additional items.

It should be understood that the foregoing description of various embodiments of the disclosure are intended merely to be illustrative thereof and that other embodiments, modifications, and equivalents of the disclosure are within the scope of the disclosure recited in the claims appended hereto.

What is claimed is:

1. A rheological measurement system comprising:
   a flow through rheometer including an inlet and an outlet;
   a tube connected to the inlet of the rheometer;
   a heater surrounding a portion of the tube external to the rheometer, wherein the heater is configured to heat at least a portion of the tube; and
   a thermowell connection adapter attached to the tube, wherein the thermowell connection adapter is constructed and arranged to be attached to an aperture located along a flow path of a viscous material in an extruder or injection molding system, wherein an open end of the thermowell connection adapter is in fluid communication with the inlet of the flow through rheometer through the tube, and wherein the thermowell connection adapter comprises a ½-20 threaded connection, wherein the tube and heater are configured to maintain a temperature of the viscous material above a predetermined temperature after the viscous material passes through the ½-20 threaded connection before reaching the flow through rheometer.

2. The rheological measurement system of claim 1, wherein the tube includes one or more bends or curves along a length of the tube.

3. The rheological measurement system of claim 1, wherein the tube is continuously operable to transfer a pressurized viscous material to the flow through rheometer, and wherein the predetermined temperature is a melting point of the viscous material.

4. The rheological measurement system of claim 1, wherein the thermowell connection adapter is connectable to the aperture while maintaining the tube rotationally stationary relative to the aperture.

5. The rheological measurement system of claim 1, wherein the thermowell connection adapter is connectable to the tube while maintaining the tube rotationally stationary relative to the thermowell connection adapter.

6. The rheological measurement system of claim 1, further comprising a valve in fluid communication with the bent tube and the flow through rheometer, wherein the valve is selectively movable between an open position and a closed position to selectively permit the flow of polymer melt to the rheometer.

7. The rheological measurement system of claim 1, wherein a length of a flow path of the tube is between or equal to 6 inches and 36 inches.

8. The rheological measurement system of claim 1, further comprising the extruder or injection molding system, and wherein the thermowell connection adapter is attached to the aperture of the extruder or injection molding system.

9. The rheological measurement system of claim 1, further comprising a remotely located computing device in communication with the flow through rheometer, wherein the remotely located computing device controls at least one operating parameter of the flow through rheometer.

10. The rheological measurement system of claim 1, further comprising a remotely located computing device in communication with the flow through rheometer, wherein the remotely located computing device displays at least one operating parameter of the flow through rheometer.

11. A material processing system comprising:
a vessel for containing a viscous material, wherein the vessel includes one or more apertures that extend from an exterior of the vessel to an interior of the vessel, wherein at least a portion of the one or more apertures include a ½-20 thread;
a flow through rheometer;
a tube extending from one or more of the apertures to an inlet of the flow through rheometer; and
a heater surrounding a portion of the tube external to the rheometer, wherein the heater is configured to heat at least a portion of the tube, wherein the heater and the tube are configured to maintain a temperature of the viscous material above a predetermined temperature after it passes through the ½-20 threaded connection before reaching the flow through rheometer.

12. The material processing system of claim 11, further comprising a thermowell connection adapter attached to the tube, wherein the thermowell connection adapter is attached to the one or more ½-20 threaded apertures.

13. The material processing system of claim 11, wherein the vessel is a portion of an extruder or injection molding system.

14. The material processing system of claim 11, further comprising a remotely located computing device in communication with the flow through rheometer, wherein the remotely located computing device controls at least one operating parameter of the flow through rheometer.

15. The material processing system of claim 11, further comprising a remotely located computing device in communication with the flow through rheometer, wherein the remotely located computing device displays at least one operating parameter of the flow through rheometer.

16. The rheological measurement system of claim 1, further comprising a positive displacement pump configured to continuously transport the viscous material to the flow through rheometer.

* * * * *